(No Model.) 5 Sheets—Sheet 1.

W. S. DOIG.
BOX NAILING MACHINE.

No. 492,086. Patented Feb. 21, 1893.

Witnesses
Jac. A. Warner
V. T. Wilson

Inventor
William S. Doig
By his Attorney
W. L. Bennem (No Model.)  5 Sheets—Sheet 2.

W. S. DOIG.
BOX NAILING MACHINE.

No. 492,086.  Patented Feb. 21, 1893.

Witnesses
Jas. F. Warner
V. T. Wilson

Inventor
William S. Doig
By his Attorney
W. L. Bennem (No Model.)  5 Sheets—Sheet 3.

W. S. DOIG.
BOX NAILING MACHINE.

No. 492,086. Patented Feb. 21, 1893.

Witnesses
Jas. F. Warner
V. T. Wilson

Inventor
William S. Doig
By his Attorney
H. L. Dennem (No Model.) 5 Sheets—Sheet 4.

W. S. DOIG.
BOX NAILING MACHINE.

No. 492,086. Patented Feb. 21, 1893.

(No Model.) 5 Sheets—Sheet 5.

W. S. DOIG.
BOX NAILING MACHINE.

No. 492,086. Patented Feb. 21, 1893.

Witnesses
Inventor
William S. Doig
By his Attorney

UNITED STATES PATENT OFFICE.

WILLIAM S. DOIG, OF BROOKLYN, NEW YORK.

BOX-NAILING MACHINE.

SPECIFICATION forming part of Letters Patent No. 492,086, dated February 21, 1893.

Application filed May 16, 1892. Serial No. 433,083. (No model.)

*To all whom it may concern:*

Be it known that I, WILLIAM S. DOIG, of Brooklyn, Kings county, State of New York, have invented certain new and useful Improvements in Box-Nailing Machines, of which the following is a specification.

This invention relates more particularly to machines for nailing boxes having a partition or partitions intermediate of its ends and it consists of the construction and novel arrangement of parts as hereinafter set forth.

In this application I have not deemed it necessary to give a detailed illustration or description of the nail trays, chutes, pockets, &c., as the same are fully shown and described in my patent No. 461,013 of October 13, 1891, to which reference may be had.

Figure 1:
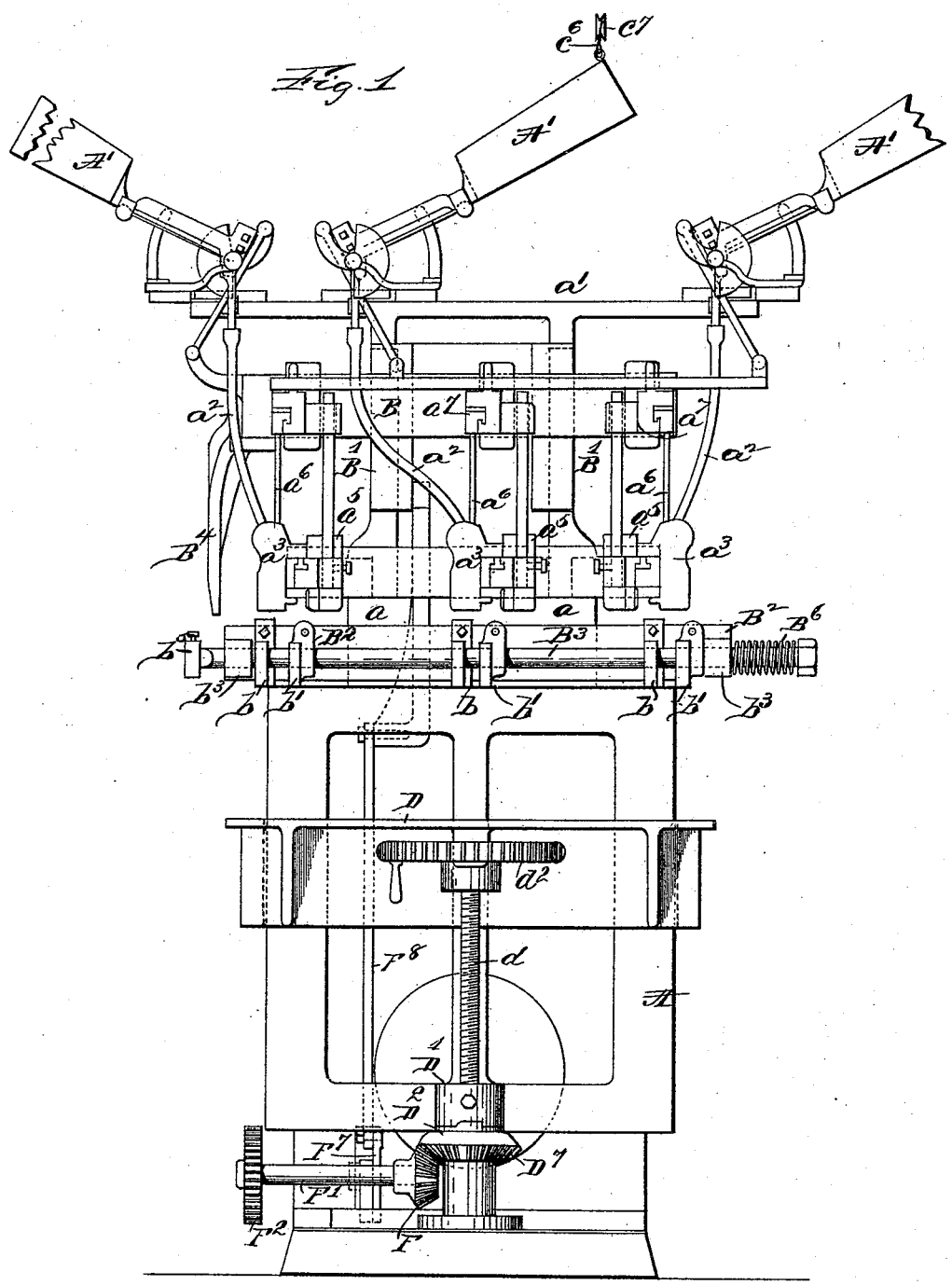
Figure 2:
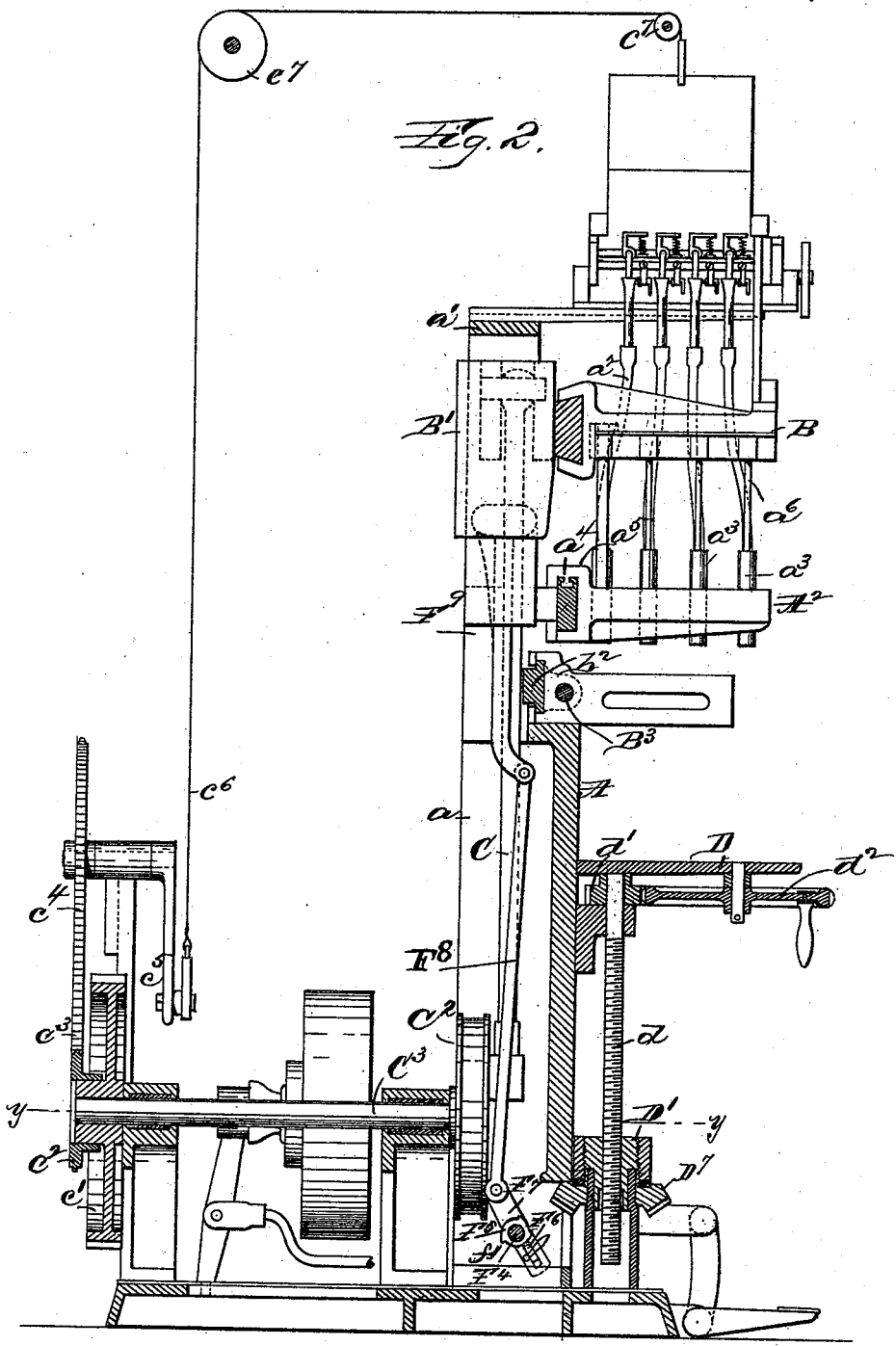
Figure 3:
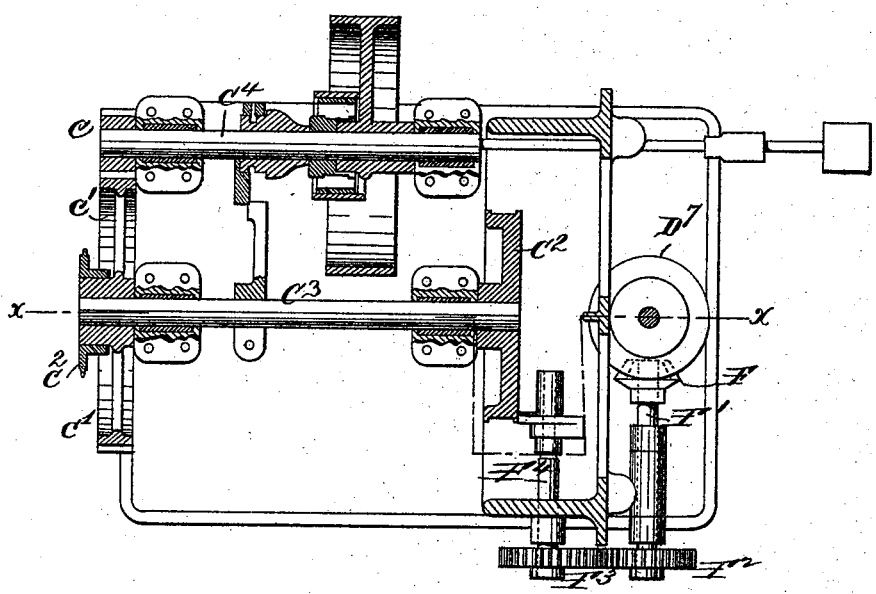
Figure 8:
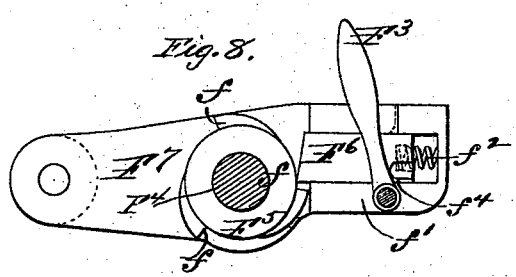
Figure 9:
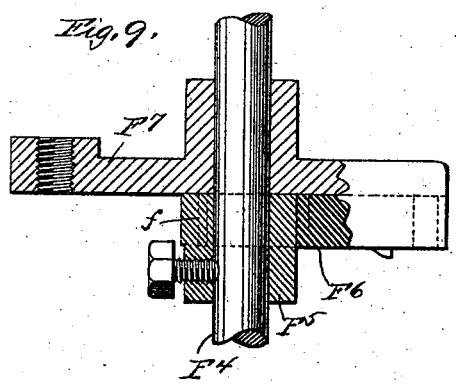
Figure 4:
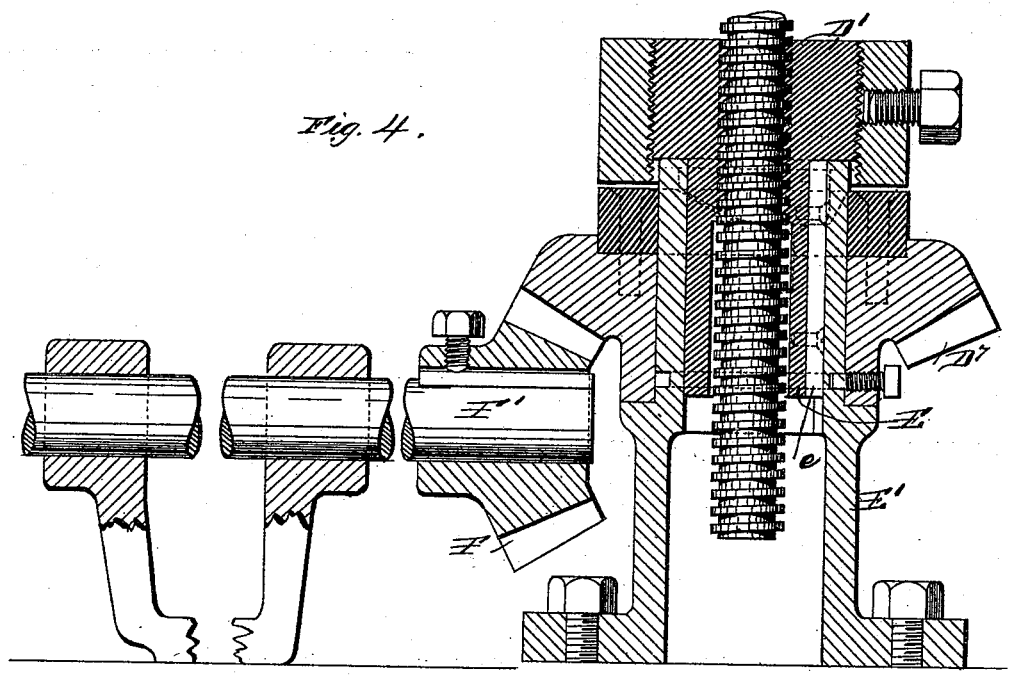
Figure 5:
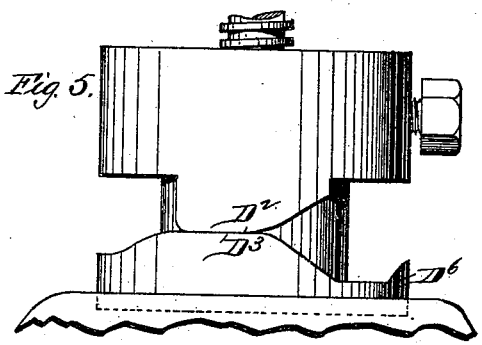
Figure 6:
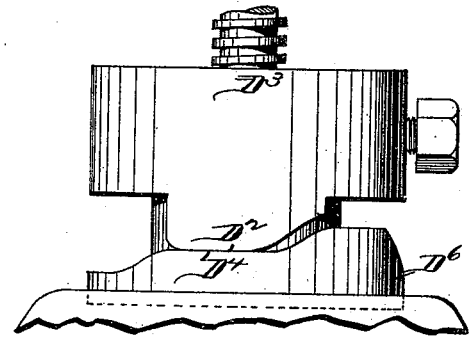
Figure 7:
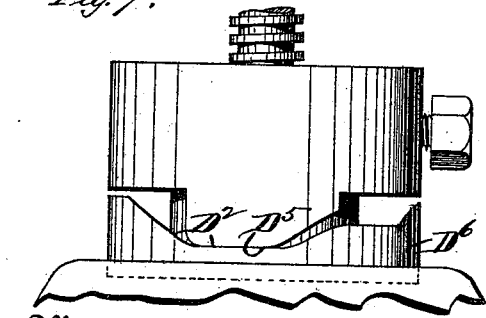
Figure 10:
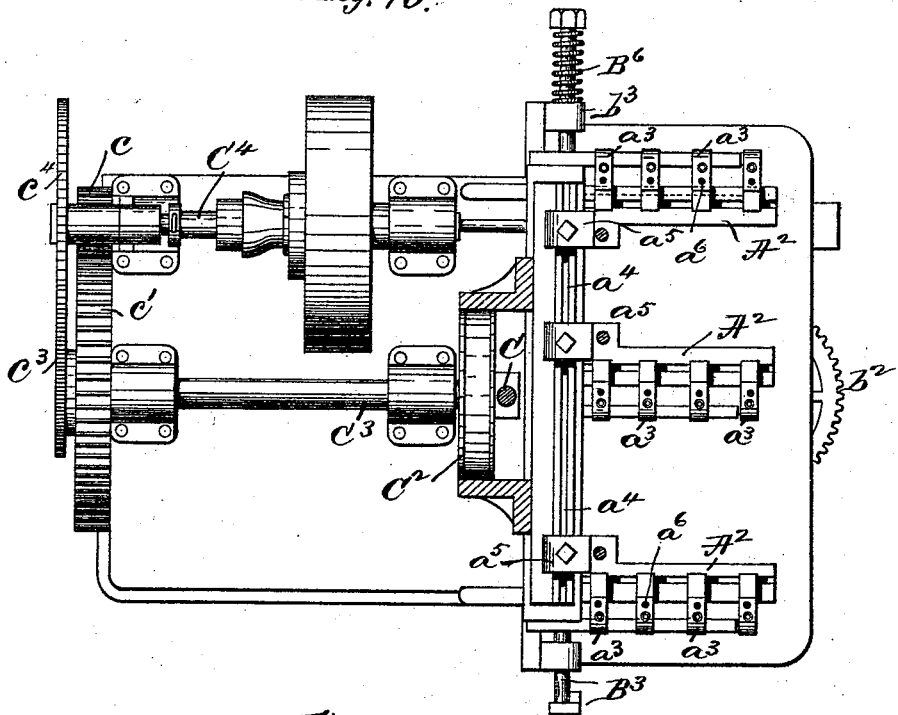
Figure 11:
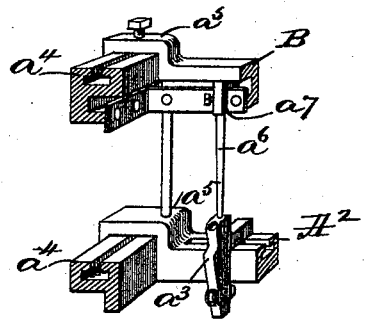

In the accompanying drawings, Figure 1 is a front elevation of a machine embodying my improvements; Fig. 2, is a vertical section thereof; at the line $x$, $x$, of Fig. 3; Fig. 3, is a horizontal section; at the line $y$, $y$, of Fig. 2; Fig. 4, is an enlarged detail section of a cam and its driving mechanism; Fig. 5, shows the cam on an enlarged scale in one position; Fig. 6, shows it in another position; Fig. 7, shows it in still another position; Figs. 8, and 9 are enlarged detail views of parts of the machine. Fig. 10 is a horizontal section of the machine, and Fig. 11 is a perspective view showing the adjustable arrangement of the nail pockets, also the arrangement of the punch rods or hammers.

Referring by letter to the drawings, A designates the main frame of the machine, comprising uprights $a$ and a top-piece $a'$. A series of nail trays A' is mounted on the top-piece $a'$, and from which flexible chutes $a^2$ extend into pockets $a^3$. The details of these parts are shown in my patent above referred to.

In this machine there are three sets of nailing devices of four each. Each set of pockets $a^3$ is mounted on an arm A² extending outward from a transverse bar $a^4$ on the uprights $a$. The arms are intended to be adjusted longitudinally of the bar $a^4$, so as to bring the pockets in proper position over end pieces or partitions of a box. I have, therefore, shown them as provided with a collar $a^5$ surrounding or engaging the bar $a^4$ and I have also represented the bar $a^4$ slotted, substantially T-shaped in cross-section, as shown in Fig. 2, for the purpose of using a dove-tailed bar in place of the collar. They may be held as adjusted by any desired means, such, for instance, as thumb-screws. The pockets are also adjustable lengthwise of the arms upon which they are mounted. The nail drivers $a^6$ are depended from heads $a^7$ which are adjustable lengthwise of arms B extending outward from a vertically reciprocating crosshead B' and upon which the said arms B are longitudinally adjustable to bring the drivers in line with the pockets through which they extend.

B² designates devices for supporting or holding the end pieces and portion of a box while the sides are being nailed thereto. Each holding device consists of a stationary jaw $b$ and an automatically movable jaw $b'$. The jaws $b$ are what I term the stationary jaws. They are, however, adjustable along a bar $b^2$ secured to the uprights $a$. The jaws $b'$ are rigidly yet adjustably mounted on a reciprocating bar B³ which has bearing in end blocks $b^3$ on the bar $b^2$ and also extends through holes in the jaws $b$. The bar B³ is moved automatically to cause the jaws to close upon an end piece or partition by means of a cam arm B⁴ depending from the cross-head B' and adapted to operate against a tappet $b^5$ on the end of the bar B³. A spring B⁶ surrounds the bar B³ between a head on its opposite end and the block $b^3$ and serves to open the jaws when the cam arm B⁴ leaves the tappet $b^5$ by the upward movement of the cross-head B'. The cross-head B' has a pitman connection C with a crank wheel C² mounted on a shaft C³ which is driven from a main or power shaft C⁴ by means of gear wheel connections $c$, $c'$. The shaft C³ carries a sprocket wheel $c^2$ which has a sprocket chain connection $c^3$ with a sprocket wheel $c^4$ the shaft of which is provided with a crank $c^5$. From this crank $c^5$ cords or similar connections $c^6$ extend over pulleys $c^7$ to the trays A', whereby a tilting motion is imparted to the trays to force the nails forward.

In this machine I provide for automatically raising or lowering a table D, to accommodate the machine to the varying width or height of a box during the process of making the same. The table D is movable up and down on the frame A, and it may be first adjusted by means of a screw-threaded rod $d$, engaging in a block D'. A gear wheel $d'$ on the upper end of the screw $d$ is engaged by a gear wheel $d^2$ carried by the table D and provided with a suitable handle. It is obvious that by turning the screw $d$ the table may be adjusted vertically before a box material is placed thereon. The block D' has a cam surface $D^2$ adapted to engage successively on the cam surfaces $D^3$, $D^4$, $D^5$, formed in a block $D^6$ carried by a bevel gear $D^7$. The block D' has a tubular hub E, extending downward into a tubular post E' erected on the base plate of the machine. The block D' is prevented from rotary motion by means of rib and groove connection $e$ between the hub E and the post E', but the block is free to move vertically.

Rotary motion is imparted to the bevel gear $D^7$ and the block $D^6$ from the cross-head B' by means of connections between said gear and cross-head which I will now describe. The gear $D^7$ meshes with a bevel gear F mounted on a shaft F' having bearings in a standard erected on the base of the machine. The outer end of the shaft F' is provided with a gear $F^2$ which engages with a gear $F^3$ mounted on a shaft $F^4$. The inner end of the shaft $F^4$ has a wheel $F^5$ provided with three ratchet-shaped teeth $f$ adapted to be engaged by a dog $F^6$ carried by a rock lever $F^7$ fulcrumed on the shaft $F^4$. The dog $F^6$ is guided in a groove $f'$ in the lever $F^7$ and is impelled forward upon the ratchet teeth by means of a spring $f^2$. This spring $f^2$ allows the dog $F^6$ to be forced back by the curved surfaces of the teeth $f$ in the usual manner. A link rod $F^8$ extends from one end of the lever $F^7$ to an arm $F^9$ depending from the cross-head B'. Obviously an upward movement of the cross-head will rock the lever $F^7$ and cause the dog to move the wheel $F^5$ one step, or one-third revolution; but a downward movement of the cross-head will not impart movement to the wheel, because the dog will yield and ride over the curved surface of a tooth $f$ to engage with the next tooth. The dog $F^6$ may be moved out of engagement with the wheel $F^5$ by means of a handle $F^3$ pivoted on the lever $F^7$ and bearing against a lug $f^4$ on the dog.

The operation of the machine is as follows: The table D being at the proper height, with the cam surface $D^2$ resting on the highest cam surface $D^3$ of the block $D^6$ as shown in Fig. 5, the end and partition boards are placed in position with one side board thereon; the machine is now operated to lower the cross-head B' to force the nails. Upon the ascent of the cross-head the block $D^6$ will be rotated one step, so that its intermediate cam surface $D^4$ will be engaged by the cam surface $D^2$, as shown in Fig. 6. This lowers the table D a distance equal to the thickness of a side board. The box is now turned and the bottom board is placed in position and nailed as before described. The upward movement of the cross-head now turns the block $D^6$ until its lowest cam surface $D^5$ is engaged by the cam surface $D^2$ as shown in Fig. 7. This allows the table to lower so that the box may be turned to have the opposite side board nailed on.

In this machine the clamping mechanism and the transverse arms carrying the pockets and pushers may be removed and the pocket and pusher mechanism described in my patented machine above referred to may be substituted, so as to nail a box in the ordinary way.

Having described my invention, what I claim is—

1. In a box nailing machine the combination with a reciprocating cross-head and nailing mechanism, substantially such as described; of a table movable vertically on the machine frame a screw-thread rod depending from the table, a block engaging with the rod, a gear wheel on the block, a gear wheel meshing with the first-named gear, and a connection comprising a ratchet mechanism between the last named gear and the cross-head, whereby the table is moved by a movement of the cross-head, substantially as specified.

2. In a box nailing machine the combination with nailing mechanism, substantially such as described, and comprising a cross-head; of a vertically movable table, a rod extending downward from the table, a block on the lower portion of this rod, provided with a cam surface, a rotary block, having a series of cam surfaces of varying height, and connections between the rotary block and cross-head, whereby said block is rotated by a movement of the cross-head, substantially as specified.

3. In a box nailing machine the combination with a frame of a transverse bar on the frame; a series of arms extending outward from the bar and adjustable lengthwise of the bar; nail pockets adjustably arranged on the arms, a cross-head, arms extending outward from said cross-head and adjustable lengthwise thereon, push rods or hammers, adjustably arranged on said arms, a vertically adjustable table, and means substantially such as described for automatically adjusting the table, step by step, to accommodate the machine to the varying width or height of a box during the process of making the same, substantially as specified.

4. In a box nailing machine the combination with the main frame, the reciprocating cross-head and the nailing mechanism, of the adjustable fixed clamping jaws $b$, the movable bar $B^3$, the jaws $b'$ carried thereby, the spring for moving the bar in one direction and the cam carried by the cross-head for moving the bar in the opposite direction, substantially as specified.

WILLIAM S. DOIG.

Witnesses:
GEO. M. PAYNTAR,
W. L. BENNEM.